United States Patent
Park et al.

(10) Patent No.: US 6,741,316 B2
(45) Date of Patent: May 25, 2004

(54) LIQUID CRYSTAL DISPLAY DEVICE AND FABRICATING METHOD THEREOF

(75) Inventors: Moo Yeol Park, Taegu-Kwangyokshi (KR); Sung Su Jung, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/320,623

(22) Filed: Dec. 17, 2002

(65) Prior Publication Data

US 2003/0169392 A1 Sep. 11, 2003

(30) Foreign Application Priority Data

Mar. 6, 2002 (KR) .................. 10-2002-0011923

(51) Int. Cl.⁷ .............................................. G02F 1/13
(52) U.S. Cl. .................. 349/153; 349/158; 349/190
(58) Field of Search ................... 349/153, 158.1, 349/90

(56) References Cited

U.S. PATENT DOCUMENTS

| | | | |
|---|---|---|---|
| 3,978,580 A | | 9/1976 | Leupp et al. |
| 4,094,058 A | | 6/1978 | Yasutake et al. |
| 4,653,864 A | | 3/1987 | Baron et al. |
| 4,691,995 A | | 9/1987 | Yamazaki et al. |
| 4,775,225 A | | 10/1988 | Tsuboyama et al. |
| 5,247,377 A | | 9/1993 | Omeis et al. |
| 5,263,888 A | | 11/1993 | Ishihara et al. |
| 5,379,139 A | | 1/1995 | Sato et al. |
| 5,406,989 A | | 4/1995 | Abe |
| 5,410,423 A | * | 4/1995 | Furushima et al. ......... 349/190 |
| 5,499,128 A | | 3/1996 | Hasegawa et al. |
| 5,507,323 A | | 4/1996 | Abe |
| 5,511,591 A | | 4/1996 | Abe |
| 5,539,545 A | | 7/1996 | Shimizu et al. |
| 5,548,429 A | | 8/1996 | Tsujita |
| 5,642,214 A | | 6/1997 | Ishii et al. |
| 5,680,189 A | | 10/1997 | Shimizu et al. |
| 5,742,370 A | | 4/1998 | Kim et al. |
| 5,757,451 A | | 5/1998 | Miyazaki et al. |
| 5,852,484 A | | 12/1998 | Inoue et al. |
| 5,854,664 A | | 12/1998 | Inoue et al. |
| 5,861,932 A | | 1/1999 | Inata et al. |
| 5,875,922 A | | 3/1999 | Chastine et al. |
| 5,952,678 A | | 9/1999 | Ashida |
| 5,956,112 A | | 9/1999 | Fujimori et al. |
| 6,001,203 A | | 12/1999 | Yamada et al. |
| 6,011,609 A | | 1/2000 | Kato et al. |
| 6,016,178 A | | 1/2000 | Kataoka et al. |
| 6,016,181 A | | 1/2000 | Shimada |
| 6,055,035 A | | 4/2000 | von Gutfeld et al. |
| 6,137,559 A | * | 10/2000 | Tanaka et al. .............. 349/153 |
| 6,163,357 A | | 12/2000 | Nakamura |
| 6,219,126 B1 | | 4/2001 | Von Gutfeld |
| 6,226,067 B1 | | 5/2001 | Nishiguchi et al. |
| 6,236,445 B1 | | 5/2001 | Foschaar et al. |
| 6,304,306 B1 | | 10/2001 | Shiomi et al. |

(List continued on next page.)

FOREIGN PATENT DOCUMENTS

| EP | 1003066 A1 | 5/2000 |
|---|---|---|
| JP | 51-065656 | 6/1976 |
| JP | 57038414 | 3/1982 |

(List continued on next page.)

*Primary Examiner*—James A. Dudek
(74) *Attorney, Agent, or Firm*—McKenna Long & Aldridge LLP

(57) ABSTRACT

Disclosed are a liquid crystal display device and a fabricating method thereof facilitating a cell-cutting process in cutting cells by the process of simultaneous scribing and breaking. The present invention includes a substrate, a closed-end main UV-hardening sealant on the substrate, and a closed-end dummy UV-hardening sealant on a periphery of the main UV-hardening sealant, wherein a width of one portion of the closed-end dummy UV-hardening sealant overlapped with a scribing line is narrower than the width of the other portions.

14 Claims, 8 Drawing Sheets

U.S. PATENT DOCUMENTS

| | | | |
|---|---|---|---|
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 6,490,022 | B1 * | 12/2002 | Hoshino ............... 349/153 |
| 6,628,365 | B1 * | 9/2003 | Park et al. ............ 349/153 |
| 2001/0021000 | A1 | 9/2001 | Egami |

FOREIGN PATENT DOCUMENTS

| | | |
|---|---|---|
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 8160871 | 6/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | 08095066 | 4/1996 |
| JP | 08-101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 3000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001117105 | 4/2001 |
| JP | 2001-117109 | 4/2001 |
| JP | 2001-133745 | 5/2001 |
| JP | 2001133794 | 5/2001 |
| JP | 2001-133799 | 5/2001 |
| JP | 2001142074 | 5/2001 |
| JP | 2001147437 | 5/2001 |
| JP | 2001154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |
| KR | 2000-0035302 A1 | 6/2000 |

* cited by examiner

LIQUID CRYSTAL DISPLAY DEVICE AND FABRICATING METHOD THEREOF

This application claims the benefit of the Korean Application No. P2002-11923 filed on Mar. 6, 2002, which is hereby incorporated by reference.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display device, and more particularly, to a liquid crystal display device and a fabricating method thereof using liquid crystal dropping.

2. Discussion of the Related Art

Generally, a liquid crystal display (LCD) device among ultra-thin flat panel displays, each having a display screen several centimeters thickness, operates at a low voltage, thereby consuming less power as well as being portable. Therefore, the liquid crystal display device has wide applicability in various fields such as a notebook computer, a monitor, a spacecraft, an airplane, and the like.

Such a liquid crystal display device generally includes a lower substrate having thin film transistors and pixel electrodes formed thereon, an upper substrate having a black matrix layer, a color filter layer, and a common electrode formed thereon so as to confront the lower substrate, and a liquid crystal layer formed between the lower and upper substrates. An electric field is generated between the substrates by the pixel and common electrodes to drive the liquid crystal layer. Light transmittance through the liquid crystal layer is controlled through the driven liquid crystal layer to display an image.

In the above-constituted liquid crystal display, the liquid crystal layer is formed between the lower and upper substrates by vacuum injecting liquid crystals between the two bonded substrates using capillary and pressure difference. Yet, such a method takes a long time for the liquid crystal injection to reduce productivity as the substrates become wider.

In order to overcome such a problem, a new method of liquid crystal dropping has been proposed, and a method of fabricating a liquid crystal display device by liquid crystal dropping according to a related art is explained by referring to the attached drawings as follows.

FIGS. 1A to 1E illustrate perspective view of a method of fabricating a liquid crystal display device by liquid crystal dropping according to a related art.

Referring to FIG. 1A, lower and upper substrates 1 and 3 are prepared. A plurality of gate and data lines (not shown in the drawing) are formed on the lower substrate 1 to cross each other to define pixel areas, respectively. A thin film transistor (not shown in the drawing) is formed at each of the crossing points between the gate and data lines. And, a pixel electrode(not shown in the drawing) is formed in each of the pixel areas to be connected to the corresponding thin film transistor.

And, a black matrix layer is formed on the upper substrate 3 to prevent light from leaking from the areas where the gate lines, data lines, and thin film transistors are formed. A color filter layer of red, green, and blue is formed on the upper substrate 3. A common electrode is formed on the upper substrate 3.

An alignment layer is formed on at least one of the lower and upper substrates 1 and 3 for initial alignment of liquid crystals.

Referring to FIG. 1B, a main sealant 7 and a dummy sealant 8 are formed on the lower substrate 1. Liquid crystal 5 is applied onto the lower substrate 1 to form a liquid crystal layer. Spacers (not shown in the drawing) are scattered on the upper substrate 3 to maintain a cell gap.

The main sealant 7 prevents leakage of the liquid crystal as well as bonds the lower and upper substrates 1 and 3 to each other.

The dummy sealant 8 protects the main sealant 7 and is formed in a dummy area on a periphery of the main sealant 7.

Yet, when an LCD panel is formed by applying liquid crystal onto a substrate, bonding of two substrates 1 and 3 is carried out after the liquid crystal has been dropped. Hence, if a thermo-hardening sealant is used as the sealant, the sealant 7 flows out during heating and contaminates the liquid crystals 5. Therefore, the liquid crystal application uses a UV (ultraviolet) hardening sealant as the sealant.

Referring to FIG. 1C, the lower and upper substrates 1 and 3 are bonded to each other.

Referring to FIG. 1D, ultraviolet light from a UV light applier (lamp) 9 is irradiated on the sealant 7 to be hardened, whereby the lower and upper substrates 1 and 3 are bonded to each other completely.

Referring to FIG. 1E, the bonded substrate 1 and 3 are cut into cell units to complete liquid crystal cells, respectively.

FIG. 2 illustrates a perspective view for explaining a cell cutting process of cutting substrates into cell units according to a related art.

Referring to FIG. 2, a scribing line 10 is formed on surfaces of the bonded substrates 1 and 3 using a scribing device such as a diamond pen having a hardness greater than that of glass, which is commonly used as a substrate material (scribing process). Mechanical shock is then impacted on the bonded substrates 1 and 3 along the scribing line using a breaking device (breaking process), whereby a plurality of unit cells are obtained.

Instead, the scribing and breaking processes may be combined into a single process using a diamond based pen or wheel to obtain each unit cell.

Meanwhile, FIG. 2 is intended to show the cell cutting process only, rather than the cell scribing line. However, a plurality of cell scribing lines are formed substantially to remove the dummy area in the periphery when the substrates are cut into unit cells.

FIG. 3 is intended to show the cell-scribing lines in detail and illustrates a layout of a lower substrate in a liquid crystal display device having sealants 7 and 8 formed thereon for showing cell-scribing lines 10 according to a related art.

Referring to FIG. 3, the cell-scribing line 10 is overlapped with the dummy sealant 8 at predetermined areas (circles). In this case, the dummy sealant 8 has been hardened by the UV irradiation process prior to the cell cutting process.

Hence, the method of forming the unit cells by scribing and then breaking is not influenced by the hardened dummy sealant 8. However, the method of forming the unit cells by simultaneously scribing and breaking to cut the substrates into unit cells does not work well due to the hardened dummy sealant 8.

SUMMARY OF THE INVENTION

Accordingly, the present invention is directed to a liquid crystal display device and a fabricating method thereof that substantially obviate one or more problems due to limitations and disadvantages of the related art.

An advantage of the present invention is to provide a liquid crystal display device and a fabricating method thereof that facilitates a cell-cutting process in cutting cells by the simultaneous process of scribing and breaking.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display device according to the present invention includes a substrate, a closed-end main UV-hardening sealant on the substrate, and a closed-end dummy UV-hardening sealant on a periphery of the main UV-hardening sealant, wherein a width of one portion of the closed-end dummy UV-hardening sealant overlapped with a scribing line is narrower than that of the other portions.

In another aspect of the present invention, a method of fabricating a liquid crystal display device includes preparing lower and upper substrates, forming a closed-end main UV-hardening sealant on one of the lower and upper substrates, forming a closed-end dummy UV-hardening sealant on a periphery of the main UV-hardening sealant so that a width of one portion of the UV-hardening sealant overlapped with a scribing line is narrower than that of the other portions, applying a liquid crystal on one of the lower and upper substrates, bonding the lower and upper substrates to each other, applying UV light to the bonded substrates, and cutting the bonded substrates into unit cells along the scribing line.

Namely, the present invention is characterized in that the width of the dummy UV-hardening sealant overlapped with the cell-scribing line is formed narrower to facilitate to cut the bonded substrates into the cell units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1A:
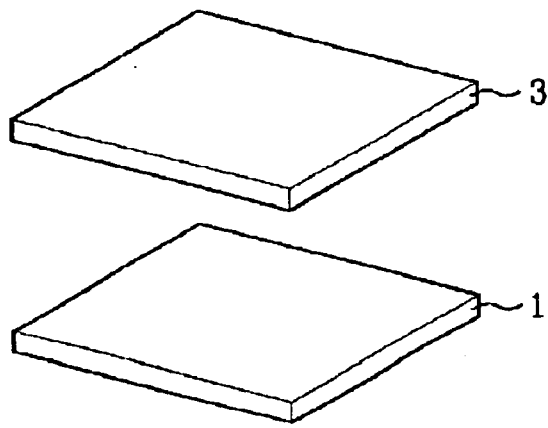
FIGS. 1A to 1E illustrate a perspective view for explaining a method of fabricating a liquid crystal display device by liquid crystal application according to a related art.
Figure 1B:
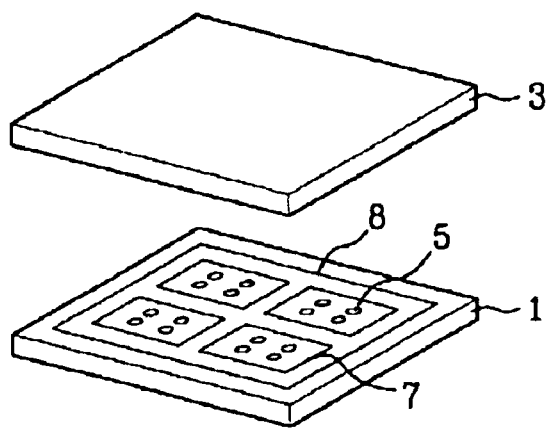
Figure 1C:
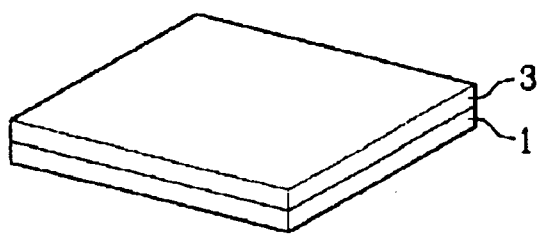
Figure 1D:
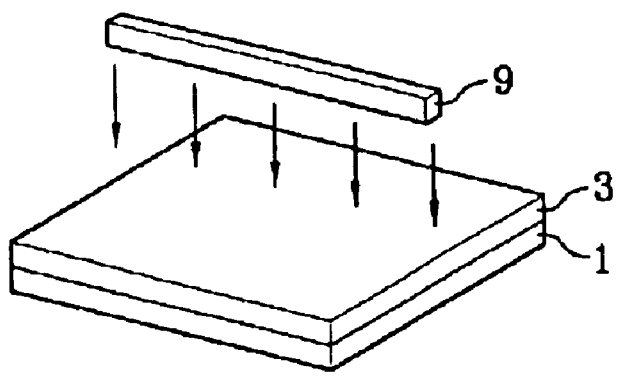
Figure 1E:
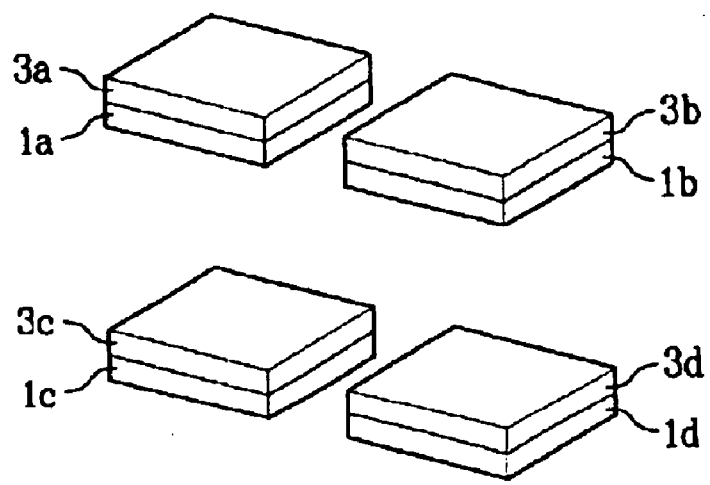
Figure 2:
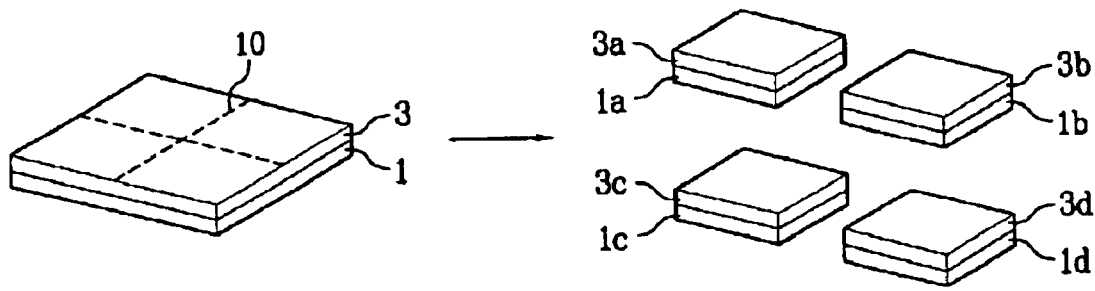
FIG. 2 illustrates a perspective view for explaining a cell cutting process according to a related art.
Figure 3:
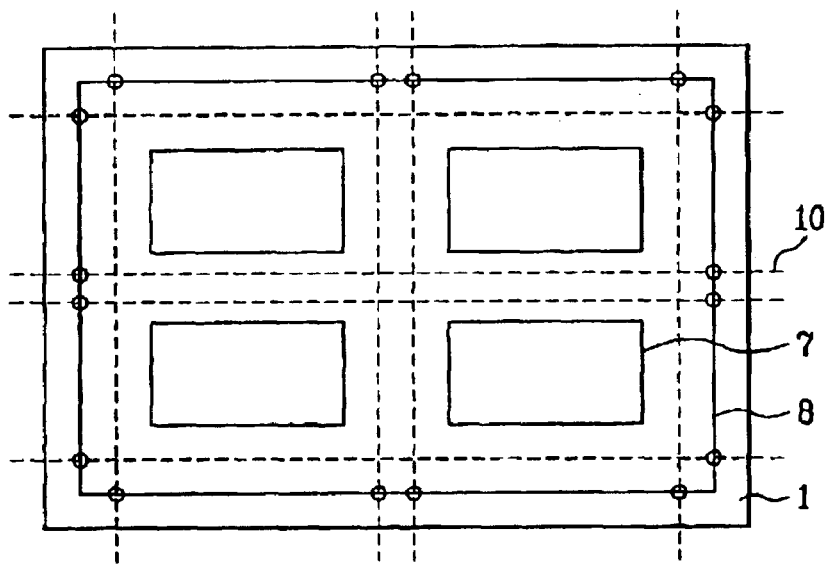
FIG. 3 illustrates a layout of a lower substrate in a liquid crystal display device having sealants formed thereon for showing cell-scribing lines according to a related art.
Figure 4A:
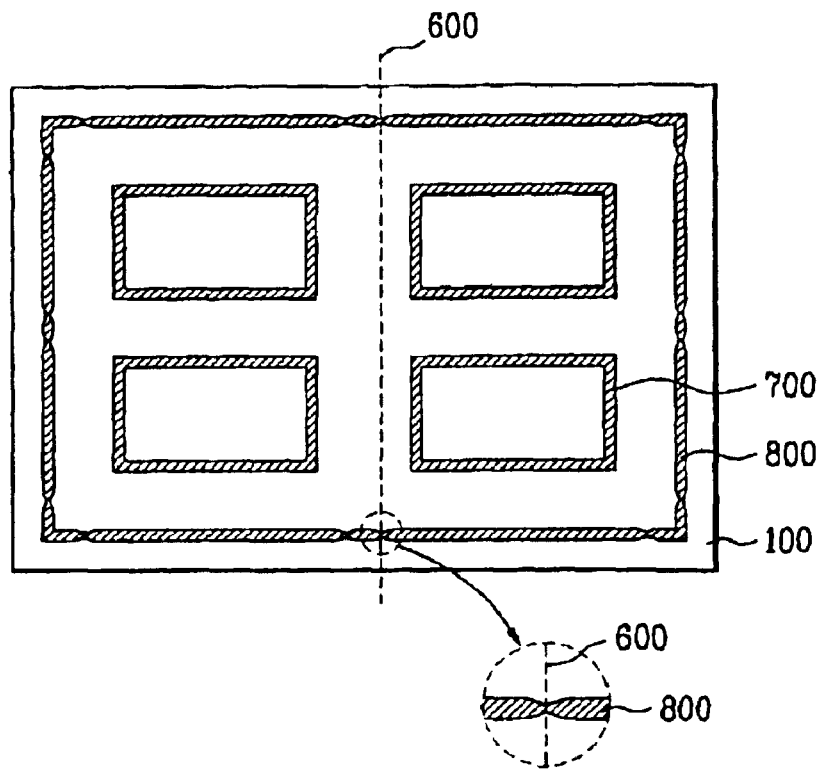
FIG. 4A illustrates a layout of one substrate for a liquid crystal display device according to one embodiment of the present invention.

FIG. 4A illustrates a layout of one substrate for a liquid crystal display device according to one embodiment of the present invention. Four unit cells are formed but the number of the unit cells is arbitrary.

Referring to FIG. 4A, a main UV-hardening sealant 700 is formed as a closed pattern having no inlet on a substrate 100.

A dummy UV-hardening sealant 800 is formed as a closed pattern on a periphery of the main UV-hardening sealant 700. In this case, a width of a portion of the dummy UV-hardening sealant 800 overlapped with a cell-scribing line 600 is formed narrower than that of the remaining portion of the dummy UV-hardening sealant 800.

In this case, the other width of the dummy UV-hardening sealant 800 formed in the area that does not overlap the cell-scribing line 600 is preferably about 1.1±0.3 mm, and the width of a portion of the dummy UV-hardening sealant 800 overlapped with a cell-scribing line 600 is preferably about 0.5±0.3 mm.

Moreover, the area having the narrower width preferably extends to about 5 mm long centering around the cell-cutting line 600.

Each of the main and dummy UV-hardening sealants 700 and 800 preferably uses a mixture of monomer or oligomer having acryl groups bonded to both ends with initiator, or another mixture of monomer or oligomer having acryl and epoxy groups bonded to both ends, respectively, with initiator.

Meanwhile, in the one embodiment of the present invention shown in FIG. 4A, the width of the dummy UV-hardening sealant is narrow in all the areas overlapped with the cell-scribing line 600.

However, in case the cells are cut along the cell-scribing line by the simultaneous scribing and breaking process, the dummy UV-hardening sealant at right or left edges of the substrate is removed if the substrates are cut along the cell-scribing line at a right side edge or a left side edge of the substrate. Hence, the removed dummy UV-hardening sealant has no influence on a later cell-cutting process.

Figure 4B:
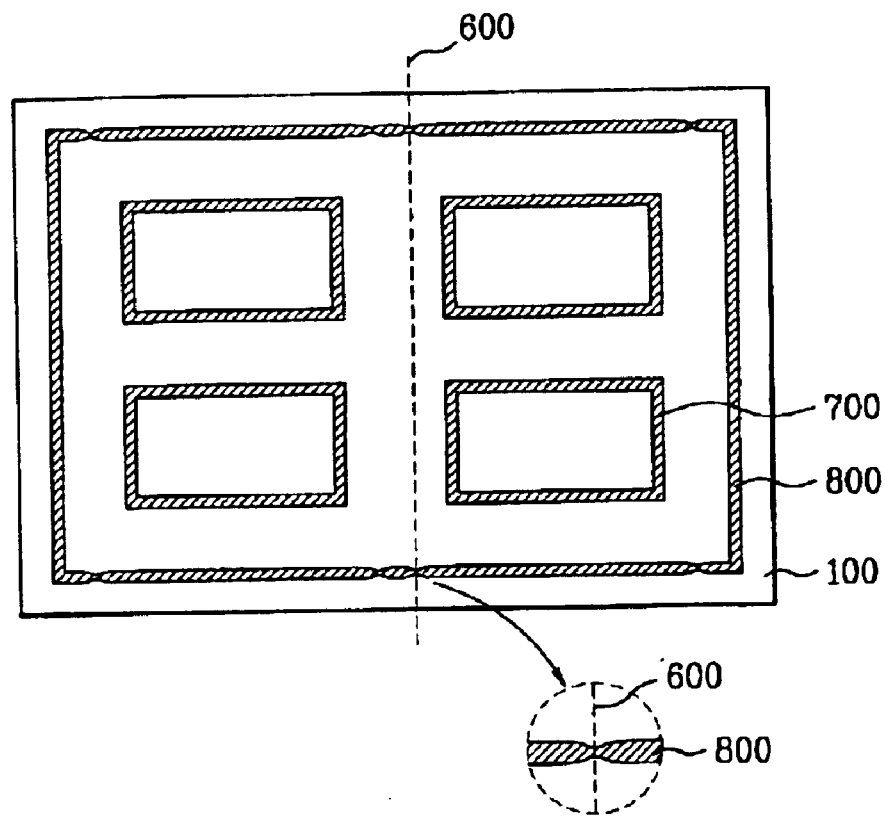
FIG. 4B and FIG. 4C illustrate layouts of substrates for liquid crystal displays according to other embodiments of the present invention, respectively.
Figure 4C:
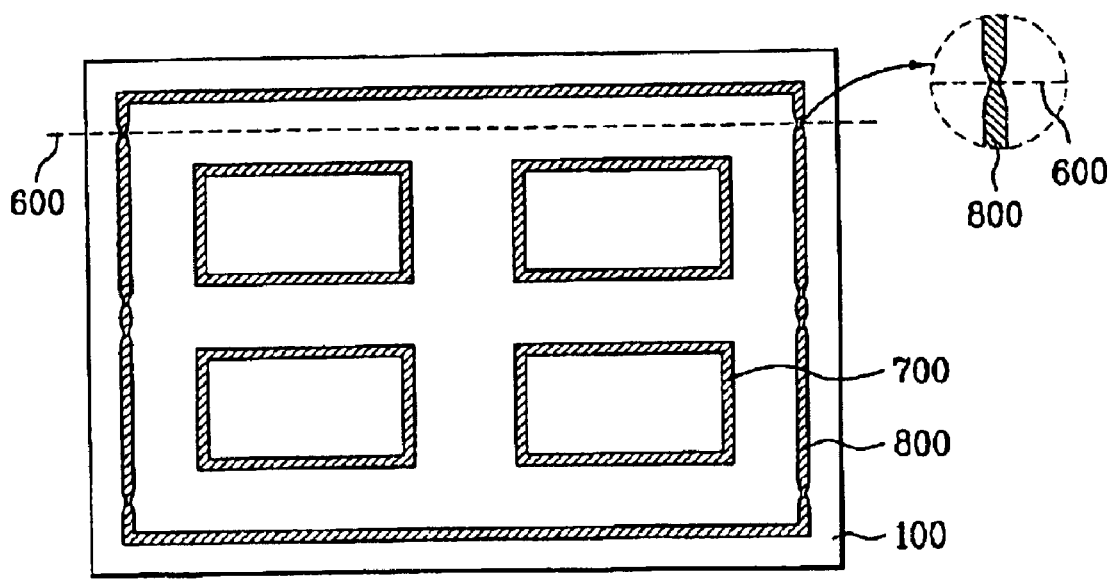

Therefore, if the widths of the dummy UV-hardening sealant along the upper and lower edges of the substrate and overlapped with the cell-scribing line, as shown in FIG. 4B, are formed narrow only or if the widths of the dummy UV sealant along the left and right side edges of the substrate, as shown in FIG. 4C, are formed narrow only, the same effect is attained for facilitating the cell cutting process.

It is a matter of course that one manner shown in FIG. 4B is applied to the case that the cell is cut firstly in the up and down direction. And, the other manner shown in FIG. 4C is applied to the other case the cell is cut firstly in the right and left direction.

Meanwhile, the liquid crystal display device includes lower and upper substrates and a liquid crystal layer formed between the two substrates, in which the sealants can be formed on one of the two substrates.

Hence, if one of the two substrates for the liquid crystal display device according to one embodiment of the present invention shown in FIG. 4A to FIG. 4C is the lower substrate, gate and data lines, thin film transistors, and pixel electrodes are formed on the substrate 100. Otherwise, a black matrix, a color filter layer, and a common electrode are formed on the substrate 100.

Moreover, a column spacer for maintaining a cell gap can be attached to one of the substrates for the liquid crystal display device. Such a column spacer is formed in an area corresponding to a gate or data line forming area and is preferably formed of a photo-reactive organic resin.

FIGS. 5A to 5E illustrate perspective views of a process of fabricating a liquid crystal display device according to one embodiment of the present invention, in which four unit cells are formed, but the number of the unit cells is arbitrary.

Figure 5A:
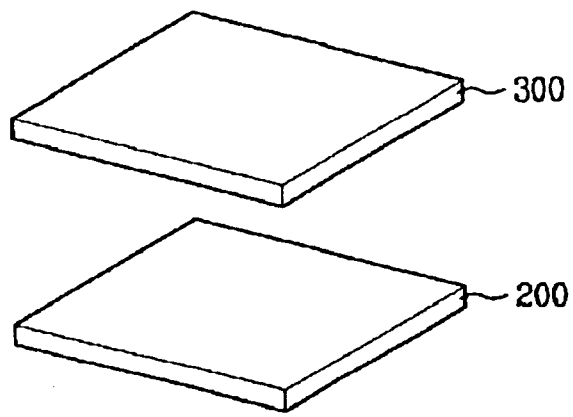
FIGS. 5A to 5E illustrate perspective views for explaining a process of fabricating a liquid crystal display device according to one embodiment of the present invention.

Referring to FIG. 5A, a lower substrate 200 and an upper substrate 300 are prepared.

Although not shown in the drawing, a plurality of gate and data lines are formed on the lower substrate 200 to cross with each other to define pixel areas, respectively. A thin film transistor including a gate electrode, a gate insulating layer, a semiconductor layer, an ohmic contact layer, source/drain electrodes, and a passivation layer is formed at each of the intersections between the gate and data lines. A pixel electrode is formed in each of the pixel areas to be connected to the thin film transistor.

Moreover, an alignment layer for initial alignment of liquid crystals is formed on the pixel electrode. In this case, the alignment layer can be formed by carrying out rubbing alignment treatment on a material such as polyamide, poyimide-based compound, polyvinylalcohol (PVA), polyamic acid, or the like or photo-alignment treatment on a photo-reactive material such as PVCN (polyvinylcinnamate), PSCN (polysiloxanecinnamate), or Cecl (cellulosecinnamate) based compound.

A black matrix layer is formed on the upper substrate 300 so as to prevent light from leaking from the areas where the gate lines, data lines, and thin film transistors are formed. A color filter layer of red, green, and blue is formed on the upper substrate 3. A common electrode is formed on the upper substrate 3. In addition, an overcoat layer can be further formed between the color filter layer and the common electrode. Moreover, the above-explained alignment layer is formed on the common electrode.

Silver (Ag) dots are formed on a circumference of the lower substrate 200 so that a voltage can be applied to the common electrode on the upper substrate 300 after completion of a bonding process of the substrates 200 and 300.

Meanwhile, in case of an IPS (in-plane switching) mode liquid crystal display device, the common electrode is formed on the lower substrate having the pixel electrodes formed thereon to induce a horizontal electric field without forming the Ag dots.

Figure 5B:
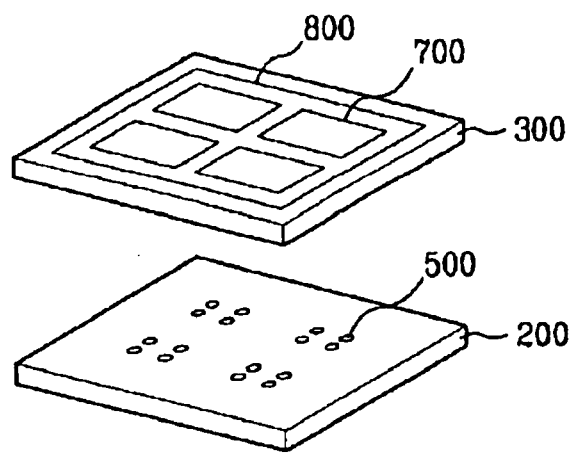

Referring to FIG. 5B, a closed main UV-hardening sealant 700 is formed on the upper substrate 300, and a closed dummy UV-hardening sealant 800 is formed on a periphery of the main UV-hardening sealant 700 so that a width of a portion overlapped with a cell-scribing line is narrower than that of the remaining portion.

The dummy UV-hardening sealant 800 is not shown in detail in the drawing but can be understood by referring to FIG. 4A to FIG. 4C.

The sealants 700 and 800 can be formed thereon by one of a screen printing method, a dispensing method, and the like. However, the screen printing method has a screen come into contact with a substrate, which can possibly cause damage on an alignment layer on the substrate or the like. The screen printing method applied to a large-sized substrate can also result in a great loss of sealant, thereby becoming uneconomical. Therefore, the dispensing method is preferably used.

In order to coat the dummy UV-hardening sealant 800 using the dispensing method, the speed at which the sealant is coated on the area that overlaps with the cell-scribing line is greater than the speed at which the sealant is coated on the other area. In this case, the sealant is coated at a speed of about 110 mm/s on one portion of each about 5 mm in length crossing with the cell-scribing line to have the width of about 0.5±0.3 mm. The sealant is coated at a speed of about 90 mm/s on the remaining portion to have the width of about 1.1±0.3 mm.

The main or dummy UV-hardening sealant 700 or 800 preferably uses a mixture of monomer or oligomer having acryl groups bonded to both ends with initiator, or another mixture of monomer or oligomer having acryl and epoxy groups bonded to both ends, respectively with initiator.

Liquid crystal 500 is applied on the lower substrate 200 to form a liquid crystal layer.

The liquid crystal 500 coming into contact with the unhardened main UV-hardening sealant 700 becomes contaminated. Hence, the liquid crystal 500 is preferably applied, dispensed or dropped onto a central portion of the lower substrate 200. The liquid crystal 500 dropped on the central portion spreads slowly, even after the main UV-hardening sealant 700 has been hardened, thereby being distributed uniformly on the substrate with the same density.

Meanwhile, FIG. 5B illustrates the process of coating the sealants 700 and 800 on the upper substrate 300 after the liquid crystal 500 has been applied onto the lower substrate 200. Instead, the liquid crystal 500 and UV-hardening sealants 700 and 800 can also be formed on the upper and lower substrates 200 and 300, respectively.

Besides, the liquid crystal 500 and UV-hardening sealant 700 and 800 can be formed on the same substrate. Yet, in case that the liquid crystals 500 and UV-hardening sealant 700 and 800 are formed on the same substrate, an imbalance in the number of process steps is generated between forming the substrate having the liquid crystals 500 and the UV-hardening sealants 700 and 800 and forming the other substrate without the liquid crystal 500 and UV-hardening sealants 700 and 800, thereby resulting in a longer overall processing time. Since the liquid crystal and the sealants are formed on the same substrate, it is difficult to clean the substrate having the sealants to remove contaminants before the bonding. Therefore, it is preferable that the liquid crystals and the sealants are formed on different substrates, respectively.

Besides, although not shown in the drawing, spacers can be formed on one of the substrates 200 and 300, and preferably, on the upper substrate 300, to maintain a cell gap.

The spacers can be formed by mixing ball spacers with a solution with a proper concentration and spraying the mixed solution including the ball spacers on the substrate through a spraying nozzle at high pressure or by attaching column spacers to the substrate to correspond to the area having the gate or data lines formed thereon. Since the ball spacers applied to a large-sized substrate is disadvantageous because a cell gap becomes uneven, it is preferable to form the column spacers on the large-sized substrate.

In this case, the column spacers are preferably formed with photosensitive (photo-reactive) organic resin.

Figure 5C:
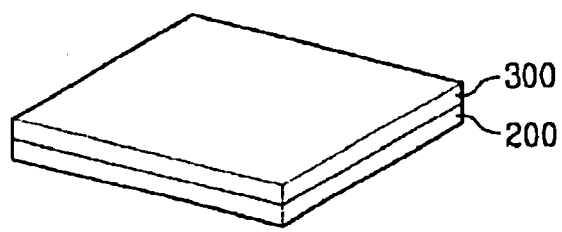

Referring to FIG. 5C, the lower and upper substrates 200 and 300 are bonded to each other.

The bonding process is carried out by fixing one substrate having the liquid crystals dropped thereon to a bottom surface, rotating 180° the other substrate to be placed over the fixed substrate so that a layer-formed surface faces downward, and pressurizing the substrate over the fixed substrate to bond the two substrates to each other or forming a vacuum state in a space between the substrates and releasing the vacuum state to bond the substrates to each other.

Figure 5D:
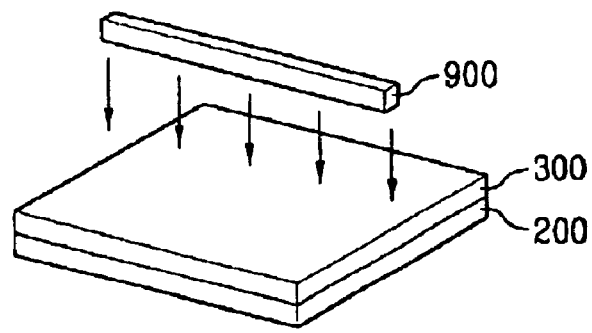

Referring to FIG. 5D, UV light is irradiated on the bonded substrates using a UV light applier 900 (e.g., a UV lamp).

Once UV light is irradiated, monomer or oligomer activated by the initiator constituting the UV-hardening sealants 700 and 800 performs polymerization to form a polymer to bond the lower and upper substrates 200 and 300 to each other.

In this case, when the UV-hardening sealants 700 and 800 are formed of monomer or oligomer, of which one end is bonded to an acryl group and of which other end is bonded to an epoxy group, mixed with initiator, the epoxy group fails to respond to UV light irradiation. Hence, an additional heating process is carried out after the UV light irradiation to harden the sealants completely. The heating process is performed at about 120° C. for an hour.

Meanwhile, if the UV light is applied to an entire surface of the bonded substrate by the UV-irradiation process, characteristics of devices such as thin film transistors and the like formed on the substrates are degraded, as well as a pretilt angle of the alignment for the initial alignment of the liquid crystals can be changed.

Therefore, it is preferable that an active area inside the main UV-hardening sealant 700 is covered with a mask 950 before applying UV light thereto.

Figure 5E:
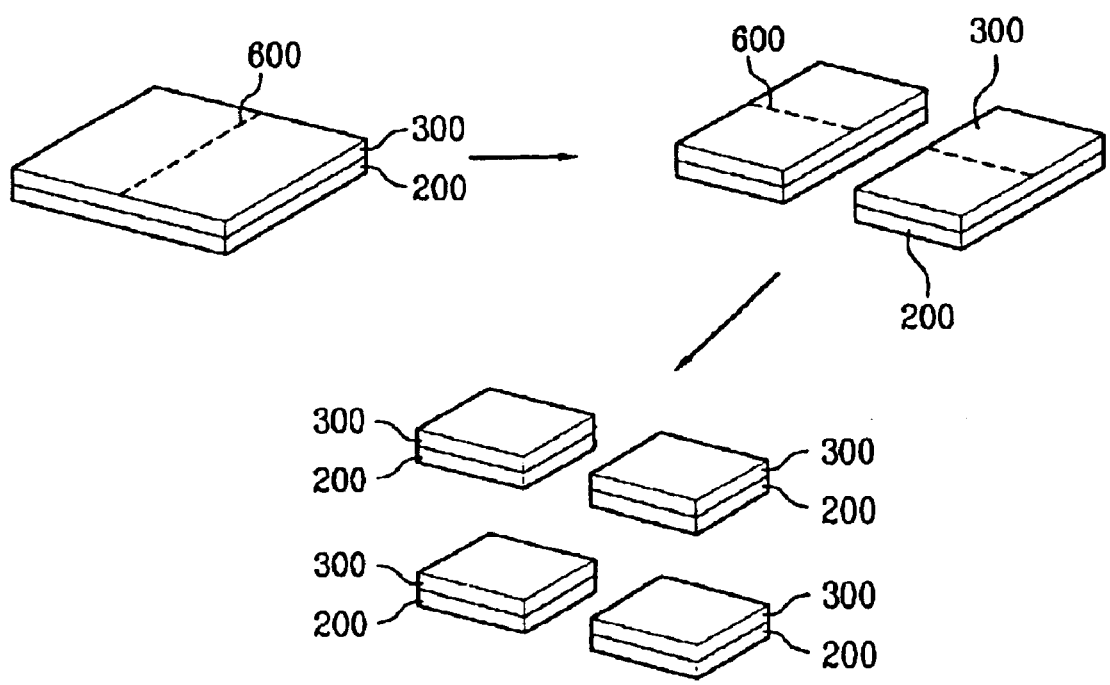
Figure 6:
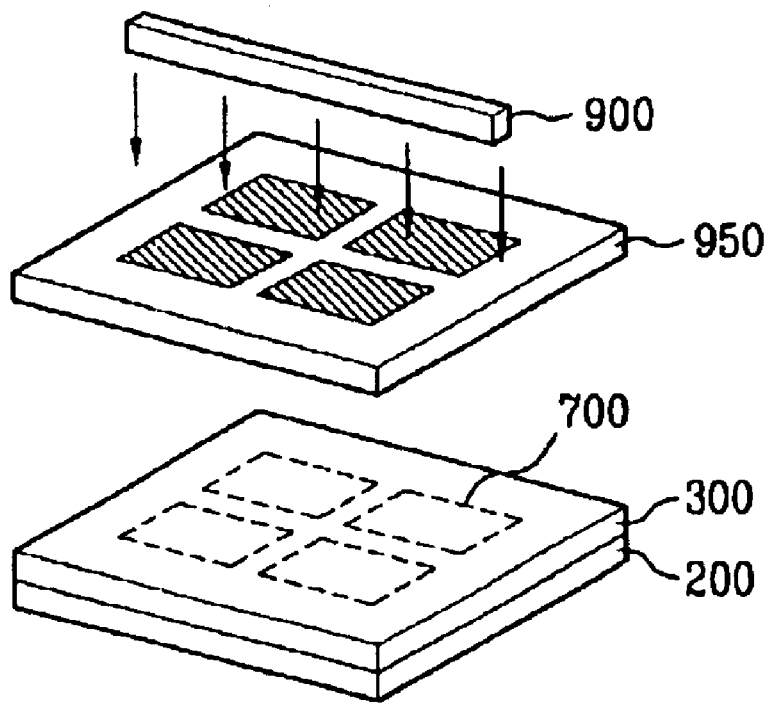
FIG. 6 illustrates a perspective view of UV light irradiation in a process of fabricating a liquid crystal display device according to another embodiment of the present invention.

Referring to FIG. 5E, the bonded substrates are cut into unit cells.

The process of cutting into unit cells is carried out in a manner that each unit cell is cut one by one along the cell-scribing line 600 by the simultaneous scribing/breaking process using the cutting device such as a diamond based pen or cutting wheel having indents.

Thus, the present invention uses the cutting device enabling carrying out of the simultaneous scribing/breaking process, thereby reducing a space occupied by equipment as well as reducing the cutting process time.

Thereafter, although not shown in the drawing, a final inspection process is carried out after the cutting process.

The final inspection process is a process of checking pass/failure before the substrate broken into the cell units is assembled into a liquid crystal module, and carried out in a manner whether the respective pixels are driven correctly with or without applying a voltage thereto.

Accordingly, the present invention forms the width of the portion of the dummy UV-hardening sealant that overlaps with the cell-scribing line to be narrower, thereby facilitating the process of cutting the bonded substrates into the cell units by the simultaneous scribing/breaking process.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A liquid crystal display device, comprising:

a substrate;

a closed-end main UV-hardening sealant on the substrate; and a closed-end dummy UV-hardening sealant on a periphery of the main UV-hardening sealant, wherein a width of one portion of the closed-end dummy UV-hardening sealant overlapped with a scribing line is narrower than that of other portions of the closed-end dummy UV-hardening sealant.

2. The device of claim 1, wherein the portion having the narrower width is formed at upper and lower or right and left sides of the closed-end dummy UV-hardening sealant.

3. The device of claim 1, further comprising:

a thin film transistor on the substrate; and a pixel electrode connected to the thin film transistor.

4. The device of claim 1, further comprising:

a black matrix on the substrate;

a color filter layer on the black matrix; and a common electrode on the color filter layer.

5. The device of claim 1, further comprising a column spacer on the substrate.

6. A method of fabricating a liquid crystal display device, comprising:

preparing lower and upper substrates;

forming a closed-end main UV-hardening sealant on one of the lower and upper substrates;

forming a closed-end dummy UV-hardening sealant on a periphery of the main UV-hardening sealant so that a width of one portion of the dummy UV-hardening sealant overlapped with a scribing line is narrower than that of a width of other portions of the dummy UV-hardening sealant;

applying a liquid crystal on one of the lower and upper substrates;

bonding the lower and upper substrates to each other;

applying UV light to the bonded substrates; and cutting the bonded substrates into unit cells along the scribing line.

7. The method of claim 6, wherein forming the closed-end main and dummy UV-hardening sealants are formed by a dispensing method.

8. The method of claim 7, wherein forming the dummy UV-hardening sealant is carried out in a manner that a coating speed on the portion overlapped with the scribing line is higher than the coating speed of the other portion.

9. The method of claim 6, wherein each of the main and dummy UV-hardening sealants is formed using one of a monomer and oligomer having acryl groups bonded to both ends.

10. The method of claim 6, wherein each of the main and dummy UV-hardening sealants is formed using one of a monomer and oligomer having acryl and epoxy groups bonded to both ends.

11. The method of claim 10, further comprising a heating after applying the UV light.

12. The method of claim 6, wherein cutting the bonded substrates into the unit cells is carried out by scribing and breaking processes.

13. The method of claim 6, wherein applying the UV-rays is carried out by masking an active area inside the main UV-hardening sealant.

14. The method of claim 6, wherein the main and dummy UV-hardening sealants are formed on the upper substrate and the liquid crystal is applied on the lower substrate.

* * * * *